A. K. BODENHORN.
TRAP NEST.
APPLICATION FILED SEPT. 24, 1915.
1,190,093. Patented July 4, 1916.
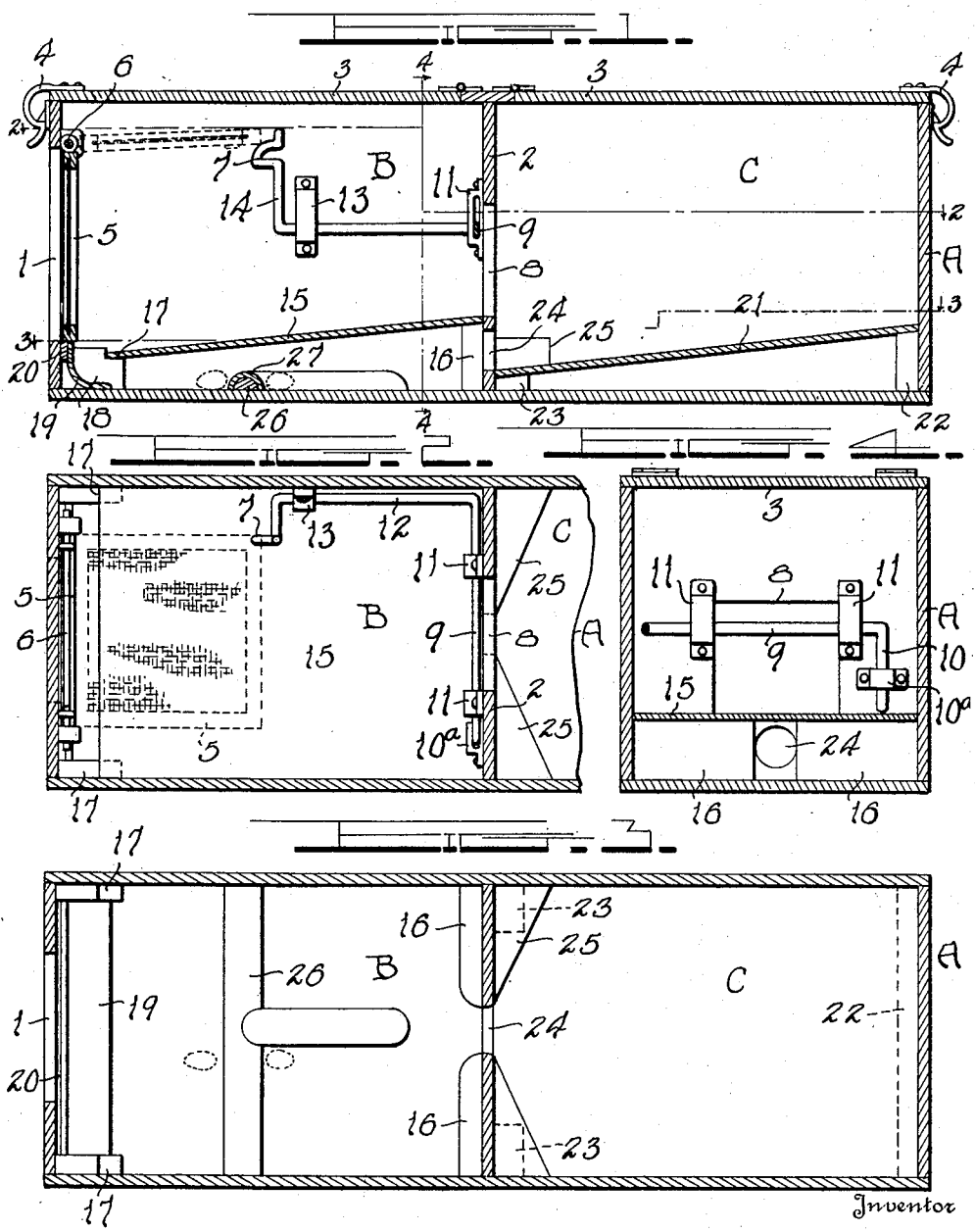
Inventor
A. K. BODENHORN
By J. V. S. Hie
Attorney

UNITED STATES PATENT OFFICE.

ALBERT K. BODENHORN, OF PUNXSUTAWNEY, PENNSYLVANIA.

TRAP-NEST.

1,190,093.  Specification of Letters Patent.  Patented July 4, 1916.

Application filed September 24, 1915. Serial No. 52,452.

*To all whom it may concern:*

Be it known that I, ALBERT K. BODENHORN, a citizen of the United States, residing at Punxsutawney, in the county of Jefferson, State of Pennsylvania, have invented a new and useful Trap-Nest; and I do hereby declare the following to be a full, clear, and exact description of the invention, such as will enable others skilled in the art to which it appertains to make and use the same.

The present invention relates to poultry culture, and more particularly to a nest which embodies novel features of construction whereby it can be used as a trap nest and also for the purpose of breaking hens of the egg eating habit, thereby avoiding what might otherwise be the necessity of killing expensive pure blooded stock.

Further objects of the invention are to provide a nest of this character which is comparatively simple and inexpensive in its construction, which admits of the eggs being removed from the nest without difficulty, which will prove particularly efficient in breaking hens that may have acquired the egg eating habit, and which may also be used as a trap nest for the purpose of keeping a record of the number of eggs laid by the different hens.

With these and other objects in view, the invention consists in certain novel combinations and arrangements of the parts as will more fully appear as the description proceeds, the novel features thereof being pointed out in the appended claims.

For full understanding of the invention, reference is to be had to the following description and accompanying drawing, in which:—

Figure 1 is a vertical longitudinal sectional view through a nest constructed in accordance with the invention. Fig. 2 is a horizontal sectional view on the line 2—2 of Fig. 1. Fig. 3 is a similar view on the line 3—3 of Fig. 1, and Fig. 4 is a detail view showing the manner of mounting the latch controlling lever.

Corresponding and like parts are referred to in the following description and indicated in all the views of the drawings by the same reference characters.

Specifically describing the present embodiment of the invention, the reference character A designates an elongated box which has an entrance opening 1 at the front thereof and is subdivided by a transverse partition 2 into a forward compartment B and a rear compartment C. Hinged doors 3 may be provided at the top of the box for closing the compartments B and C, suitable latches 4 being shown for normally holding the doors in a closed position. The entrance opening 1 at the forward end of the box A is adapted to be closed by a swinging door 5 which is hinged at the top thereof, as indicated at 6, so as to swing inwardly and upwardly, the door being normally held in an open position by a latch member 7, as indicated by dotted lines on Fig. 1. The transverse partition between the front compartment B and rear compartment C is provided with an opening 8 which is just sufficiently large in size to admit of a hen passing through the same. A latch lever 9 extends transversely across the upper portion of the opening 8, having one end thereof bent downwardly at 10 and engaging a horizontal guide $10^a$ secured to the partition 2 at one side of the opening which prevents rotation and horizontal movement of the lever. The opposite end of the latch lever is received within suitable guides 11 and carries a forwardly extending arm 12 which is received within a vertical guide 13 and terminates in an upright arm 14 carrying the nose 7 of the latch. When the door 5 is swung inwardly and upwardly into an open position, the rear edge thereof rests upon the nose 7 of the latch, although a hen in passing through the opening 8 will engage the latch lever and lift the same upwardly a sufficient amount to move the nose 7 of the latch out of engagement with the edge of the door 5 and release the latter so that it will swing downwardly into a closed position. It has been found that a hen upon entering the front compartment B will invariably go through the opening 8 into the rear compartment C in order to investigate the latter, and in passing through the opening 8 the latch lever 9 is lifted upwardly a sufficient amount to disengage the latch from the front door and cause the latter to swing downwardly into a closed position. The hen is thus trapped in the nest, and in this manner an accurate record can be kept of the number of eggs laid by each hen. If this is not desired, the door 5 can be either removed or fastened in an open position.

The front compartment B is provided with a removal bottom board 15 which is inclined downwardly toward the front of the nest, the rear end of the board resting upon a cleat 16, while the forward end thereof is spaced from the front of the nest and engages notches 17 in blocks 18 arranged in the corners of the nest. A curved apron 19 is provided at the front of the nest for engaging eggs rolling down the inclined bottom board 15 and deflecting them under the said bottom board. This curved guide apron 19 may be formed of any suitable material such as corrugated pasteboard, and is shown in the present instance as secured to a transverse strip 20. With this construction, any egg which may be laid in the front compartment B will roll down the inclined bottom board 15 and be deflected under the same by the curved apron 19, so as to be inaccessible to the hen. In a somewhat similar manner the rear compartment C is provided with an inclined bottom board 21 which slides downwardly toward the front of the compartment, said bottom board being supported upon a cleat 22 at the rear of the compartment, and upon small blocks 23 at the forward corners of the compartment. An opening 24 is provided in the transverse partition at a point under the main opening 8, said opening 24 being of sufficient size to admit of the ready passage of an egg through the same into the space under the inclined bottom board 15 of the forward compartment B. For the purpose of deflecting eggs from the inclined bottom board 21 of the rear compartment C into the opening 24, the lower edge of the said inclined bottom board is provided at the corners thereof with substantially triangular blocks 25 providing inclined walls which will deflect an egg through the opening 24 from either side of the bottom board. It will thus be seen that any egg laid within the rear compartment C will quickly roll down the inclined bottom board 21 and fall through the opening 24 into the space under the inclined bottom board 15 of the front compartment B. The eggs are thus rendered inaccessible to the hens so that they can not be eaten thereby, and such an arrangement will very quickly break any hens of the egg eating habit. Another important result accomplished by the arrangement of the parts above described, besides rendering the eggs inaccessible to the hens, is that the eggs laid in both compartments can be easily and quickly removed at the same time, it being merely necessary to open either the entrance door 5 or the cover 3 of the front compartment and raise the inclined bottom 15 therein, after which the eggs laid in both compartments of the nest can be removed from the front compartment. Without the opening 24 in the partition 2 for the passage of the eggs laid in the rear compartment C to the egg receiving chamber in the front compartment, and the particular arrangement of the inclined bottoms 15 and 21 as described, it would be necessary to lift the covers 3 to both compartments and the inclined bottoms 15 and 21 therein in order to remove the eggs laid in both compartments. It will thus be obvious that the removal of the eggs is greatly facilitated and simplified by the construction shown and described.

The bottom of the box A is preferably provided under the inclined bottom board 15 of the forward compartment B with transverse and longitudinal ribs 26 arranged in the form of a T so as to tend to separate a number of eggs which may be collected in the egg receiving chamber and prevent the eggs from becoming broken by striking against each other. If desired a soft covering 27 of felt or like material may be applied to the ribs 26. The transversely extending rib 26 will separate the eggs received from the front compartment B and rear compartment C, while the longitudinally extending rib 26, providing the stem of the T, will tend to deflect eggs received from the rear compartment C to opposite sides of the egg receiving chamber. When the latch mechanism is used in connection with the front door, the device may be employed as a trap nest, as well as utilized for the purpose of breaking hens of the egg eating habit, although if it is not desired to keep a record of the number of eggs laid by each hen, the front door 5 may be permanently secured in an open position.

Having thus described the invention, what I claim as new and desire to secure by Letters Patent, is:—

1. A device of the character described, including a nest box subdivided by an intermediate partition into two compartments and provided with an entrance opening leading into the outer compartment, said outer compartment being provided with an egg receiving chamber and the partition being formed with an opening communicating with the egg receiving chamber, an inclined bottom board arranged within the inner compartment, and guide means for directing an egg from the lower end of the inclined bottom board through the opening of the partition into the egg receiving chamber, in combination with means for entrapping the hen in the nest operated by her passage from the outer compartment into the inner compartment.

2. A device of the character described, including a nest box subdivided by a partition into two compartments, and provided with an entrance leading into the outer compartment, an inclined bottom board mounted within the outer compartment and arranged above the bottom thereof to provide an egg receiving chamber under the bottom board, an inclined apron arranged opposite the lower edge of the said bottom board for deflecting an egg into the egg receiving chamber, the before mentioned partition being provided with an opening leading from the egg receiving chamber to the inner compartment, an inclined bottom board arranged within the inner compartment, and means at the lower end of the second mentioned inclined bottom board for deflecting an egg through the opening of the partition into the egg receiving chamber, in combination with means for entrapping the hen in the nest operated by her passage from the outer compartment into the inner compartment.

3. A device of the character described, including a nest box subdivided by a partition into communicating inner and outer compartments and provided with an entrance opening leading to the outer compartment, an inclined bottom board arranged within the outer compartment above the bottom thereof to provide an egg receiving chamber under the bottom board, means for directing an egg from the lower end of the inclined bottom board into the egg receiving chamber, an inclined bottom board arranged within the inner compartment, means for directing an egg from the inclined bottom board of the inner compartment into the egg receiving chamber, and ribs projecting from the bottom of the egg receiving chamber to separate the eggs received from the two compartments, in combination with means for entrapping the hen in the nest operated by her passage from the outer compartment into the inner compartment.

In testimony whereof I have signed my name to this specification in the presence of two subscribing witnesses.

ALBERT K. BODENHORN.

Witnesses:
ADA HAUCK,
GERTRUDE PARKHILL.

Copies of this patent may be obtained for five cents each, by addressing the "Commissioner of Patents, Washington, D. C."